(12) United States Patent
Adonyi et al.

(10) Patent No.: US 9,374,853 B2
(45) Date of Patent: Jun. 21, 2016

(54) METHOD FOR JOINING TWO DISSIMILAR MATERIALS AND A MICROWAVE SYSTEM FOR ACCOMPLISHING THE SAME

(71) Applicant: LeTourneau University, Longview, TX (US)

(72) Inventors: Yoni Adonyi, Longview, TX (US); Seunghyun Kim, Longview, TX (US); Allen Worcester, Longview, TX (US); Ithamar Glumac, League City, TX (US)

(73) Assignee: LETOURNEAU UNIVERSITY, Longview, TX (US)

( * ) Notice: Subject to any disclaimer, the term of this patent is extended or adjusted under 35 U.S.C. 154(b) by 710 days.

(21) Appl. No.: 13/768,052

(22) Filed: Feb. 15, 2013

(65) Prior Publication Data

US 2014/0224789 A1  Aug. 14, 2014

Related U.S. Application Data (60) Provisional application No. 61/762,639, filed on Feb. 8, 2013.

(51) Int. Cl.
*H05B 6/80* (2006.01)

(52) U.S. Cl.
CPC .............. *H05B 6/80* (2013.01); *B23K 2203/18* (2013.01)

(58) Field of Classification Search
CPC ........ H05B 6/80; H01P 7/06; B23K 2203/18; B23K 2203/42; B23K 2203/52
USPC ........................................................ 333/233
See application file for complete search history.

(56) References Cited

U.S. PATENT DOCUMENTS

| | | | |
|---|---|---|---|
| 3,555,231 A | 1/1971 | Laurentie | |
| 3,873,944 A | 3/1975 | Vaguine et al. | |
| 3,940,721 A * | 2/1976 | Kojima | H01P 1/28 315/5.46 |
| 4,777,336 A | 10/1988 | Asmussen | |
| 4,866,346 A | 9/1989 | Gaudreau et al. | |
| 5,058,800 A | 10/1991 | Yoshizawa et al. | |
| 5,720,859 A | 2/1998 | Czubarow et al. | |
| 5,734,143 A | 3/1998 | Kawase et al. | |

(Continued)

FOREIGN PATENT DOCUMENTS

| | | |
|---|---|---|
| CN | 2833285 Y | 11/2006 |
| CN | 101462214 A | 6/2009 |

(Continued)

OTHER PUBLICATIONS

Stein et al., "Microwave Processing of Materials", Jul. 1994, National Research Council, pp. 1-143.*

(Continued)

*Primary Examiner* — Geoffrey S Evans (57) ABSTRACT

The present disclosure provides a method for joining two materials, and a system for accomplishing the same. The method for joining two materials, in this aspect, includes placing an article including two dissimilar materials within a waveguide structure, the article located between a microwave source and reflective surface of the waveguide structure. The method for joining the two materials, in this aspect, further includes subjecting the article to microwaves from the microwave source while changing a relative position of the article with respect to the reflective surface to dynamically change a microwave field distribution within the waveguide and join the two dissimilar materials.

20 Claims, 6 Drawing Sheets

(56) References Cited

U.S. PATENT DOCUMENTS

| | | | |
|---|---|---|---|
| 5,770,143 A | 6/1998 | Hawley et al. | |
| 5,798,395 A | 8/1998 | Lauf et al. | |
| 5,804,801 A | 9/1998 | Lauf et al. | |
| 5,832,598 A | 11/1998 | Greenman et al. | |
| 5,844,217 A | 12/1998 | Hawley et al. | |
| 6,372,084 B2 | 4/2002 | Hongo et al. | |
| 6,644,536 B2 | 11/2003 | Ratificar et al. | |
| 6,870,124 B2 | 3/2005 | Kumar et al. | |
| 7,015,441 B2 | 3/2006 | Fagrell et al. | |
| 7,034,266 B1* | 4/2006 | DeGroot | H05B 6/74 219/695 |
| 7,170,027 B2 | 1/2007 | Kurashima et al. | |
| 7,227,097 B2 | 6/2007 | Kumar et al. | |
| 7,309,843 B2 | 12/2007 | Kumar et al. | |
| 7,608,798 B2 | 10/2009 | Kumar et al. | |
| 7,611,687 B1 | 11/2009 | Harutyunyan | |
| 7,638,727 B2 | 12/2009 | Kumar et al. | |
| 7,931,884 B2 | 4/2011 | Harutyunyan | |
| 7,985,657 B1* | 7/2011 | Budraa | H01L 21/187 257/E21.122 |
| 2003/0066486 A1 | 4/2003 | Zheng et al. | |
| 2003/0121958 A1 | 7/2003 | Ratificar et al. | |
| 2004/0084444 A1* | 5/2004 | Wang | B29C 65/1425 219/679 |
| 2005/0061446 A1 | 3/2005 | Kumar et al. | |
| 2009/0206073 A1* | 8/2009 | Kinoshita | H02M 1/32 219/715 |
| 2009/0255926 A1* | 10/2009 | Tian | B23K 13/01 219/702 |
| 2009/0267264 A1 | 10/2009 | Tranter et al. | |
| 2010/0282741 A1 | 11/2010 | Van Daele et al. | |
| 2011/0033636 A1 | 2/2011 | Nishimura et al. | |
| 2012/0088950 A1 | 4/2012 | Dodds et al. | |

FOREIGN PATENT DOCUMENTS

| | | | |
|---|---|---|---|
| DE | 102004049060 A1 | | 6/2005 |
| DE | 102005059965 A1 | | 6/2007 |
| EP | 932327 A1 | * | 7/1999 |
| JP | 56164025 A | | 12/1981 |
| JP | 08078398 | | 3/1996 |
| JP | 08-183932 A | * | 7/1996 |
| JP | 9301783 A | | 11/1997 |
| JP | 10003986 A | | 1/1998 |
| JP | 2006517260 A | | 7/2006 |
| JP | 2008-296620 A | * | 12/2008 |
| JP | 2009138271 A | | 6/2009 |
| JP | 2010129790 A | | 6/2010 |
| JP | 2012084438 A | | 4/2012 |
| WO | WO9613621 A1 | | 5/1996 |
| WO | WO2004048463 A1 | | 6/2004 |
| WO | WO2007068647 A1 | | 6/2007 |
| WO | WO2007073205 A1 | | 6/2007 |

OTHER PUBLICATIONS

Das et al., "Theory of welding Metallic Parts in a Microwave Cavity Applicator" Sep. 2012, Fundamental J. Modern Physics, vol. 3, Issue 2, pp. 125-155.*

* cited by examiner

METHOD FOR JOINING TWO DISSIMILAR MATERIALS AND A MICROWAVE SYSTEM FOR ACCOMPLISHING THE SAME

CROSS-REFERENCE TO RELATED APPLICATION

This application claims the benefit of U.S. Provisional Application Ser. No. 61/762,639, filed on Feb. 8, 2013, entitled "A METHOD FOR JOINING TWO DISSIMILAR MATERIALS AND A MICROWAVE SYSTEM FOR ACCOMPLISHING THE SAME," commonly assigned with this application and incorporated herein by reference.

TECHNICAL FIELD

The present invention is directed, in general, to a method for joining two materials and, more specifically, to a method for joining two dissimilar materials using microwaves, and a microwave system for accomplishing the same.

BACKGROUND

There is currently a desire across many industries to accurately and safely join two dissimilar materials. For example, there is currently a desire to join polymer/ceramics and metals for thermoelectric generator applications. There is also a desire to join polymer/ceramics and metals for very large scale integration (VLSI) integrated circuit (IC) applications, among others.

Figure 1:
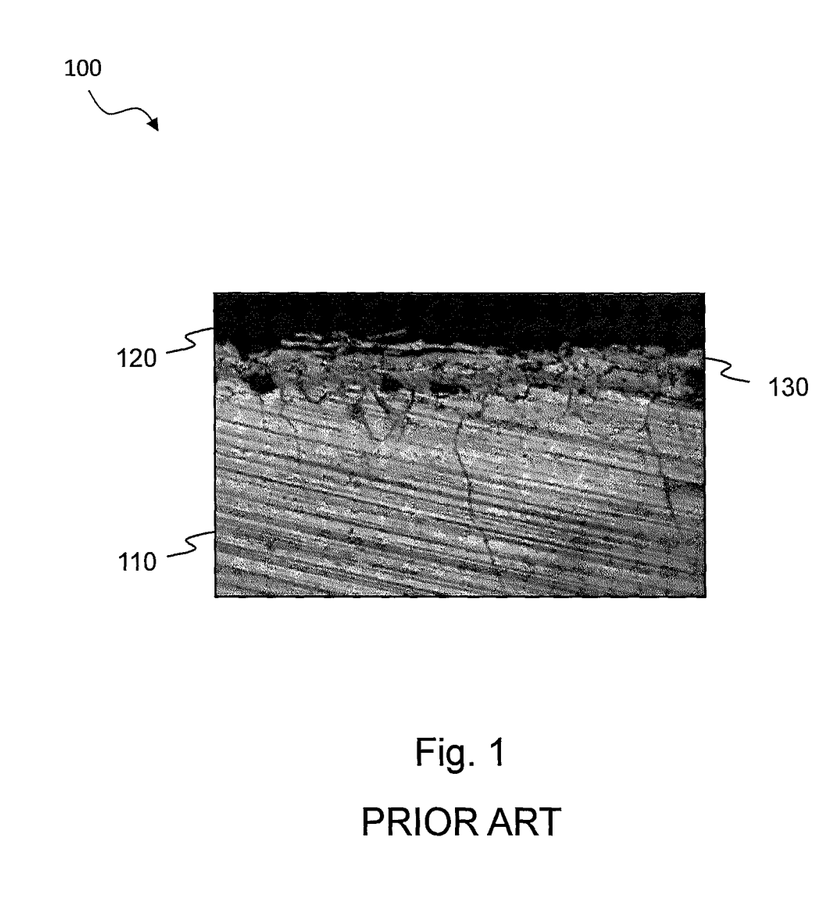
FIG. 1 illustrates a work piece including a polymer/ceramic material having undergone a joining process with a metal material.

Unfortunately, joining two dissimilar materials, for example having large coefficient of thermal expansion (CTE) mismatches, is difficult. Because of the mismatch in CTE values, fracturing may occur between the two dissimilar materials if the joining is conducted improperly. Turning briefly to Prior Art FIG. 1, illustrated is a work piece 100 including a polymer/ceramic material 110 having undergone a joining process with a metal material 120. In this circumstance, the polymer/ceramic material 110 and metal material 120 were improperly joined, resulting in cracks 130 from thermal shock.

Accordingly, what is needed in the art is a new method for joining two dissimilar materials and a system for accomplishing the same, which do not experience the problems discussed above.

SUMMARY

To address the above-discussed deficiencies of the prior art, the present disclosure provides a method for joining two materials. The method for joining two materials, in this aspect, includes placing an article including two dissimilar materials within a waveguide structure, the article located between a microwave source and reflective surface of the waveguide structure. The method for joining the two materials, in this aspect, further includes subjecting the article to microwaves from the microwave source while changing a relative position of the article with respect to the reflective surface, to dynamically change a microwave field distribution within the waveguide and join the two dissimilar materials.

Further provided is a microwave system for heating. The microwave system, in this aspect, includes a waveguide structure having a reflective surface, and a microwave source coupled to the waveguide structure and configured to project microwaves toward the reflective surface. The microwave system, in this aspect, further includes a stage located within the waveguide structure between the microwave source and the reflective surface, the stage configured to position an article within the waveguide structure. In one aspect of the microwave system, at least one of the reflective surface or stage is configured move to change a relative position of the article with respect to the reflective surface.

Additionally provided is an alternative method for joining two materials. The alternative method, in this aspect, includes: 1) placing an article including two dissimilar materials within a waveguide structure, the article located between a microwave source and reflective surface of the waveguide structure, and 2) heating the article in a plasma-less environment using dielectric heating, eddy current heating, or hysteresis heating by subjecting the article to microwaves from the microwave source while changing a relative position of the article with respect to the reflective surface to dynamically change a microwave field distribution within the waveguide and join the two dissimilar materials.

BRIEF DESCRIPTION OF THE DRAWINGS

For a more complete understanding of the present disclosure, reference is now made to the following descriptions taken in conjunction with the accompanying drawings, in which.

Prior Art

DETAILED DESCRIPTION

The present disclosure is based, at least in part, on the acknowledgement that microwaves may be used to accurately join an article comprising two materials (e.g., dissimilar materials) when the heating rate of the article is controlled. For example, the present disclosure acknowledges that microwaves may be used to accurately join two materials when the article is heated at a substantially controlled heating rate. The substantially controlled heating rate, in this embodiment, allows the system to accommodate for the differing coefficient of thermal expansion (CTE) values amongst the different materials, and thus attempt to prevent damage to an interface between the different materials. While most commercial microwaves work in an open-loop and randomly generate heating (main output) at preset times (main input), the present disclosure includes a closed-loop system that uses time as an intermediate output, as opposed to a main input.

The phrase "joining," as used herein with regard to the two different materials, includes any method for attaching two different materials, including soldering, brazing, welding, etc. The phrase "joining," as used herein may or may not involve melting or solidification at the interface between the two different materials.

With the foregoing acknowledgment in mind, the present disclosure has recognized that one way to provide the controlled (e.g., substantially controlled) heating rate is to dynamically change the microwave field distribution surrounding the article comprising the two different materials being joined. The term "dynamically," at least as it relates to the change in microwave field distribution, means that the microwave field distribution changes while the article is being subjected to the microwaves. The term "dynamically," does not encompass, and intentionally excludes, those situations wherein the microwave source is turned off while the changes to the microwave field distribution are being made—and thus the article is not being subjected to the microwaves while the microwave field distribution is being changed.

The present disclosure has recognized that the microwave field distribution surrounding the article may be changed by altering a relative position of the article with respect to the back reflective surface (i.e., microwave reflective surface). Thus, while the article is being subjected to the microwaves, the relative position of the article with respect to the back reflective surface may be altered to change the microwave field distribution surrounding the article. The change in relative position can be either a change in the position of the reflective surface or a change in position of the article.

Having recognized a way to change the microwave field distribution surrounding the article, the present disclosure further recognized that temperature information of the article could be fed back to a controller to continually change the relative position of the article with respect to the reflective surface. With the ability to continually—and dynamically—change the relative position of the article with respect to the reflective surface, for example in real time, the present disclosure is capable of achieving the substantially controlled heating rate discussed above, and thus not experience the fracturing issues discussed above.

Unlike most heating processes, electromagnetic heating (e.g., using a microwave source) is internal and not produced in discrete quantities from a source. For a normal heating process such as a hot plate or a Bunsen burner, the amount of heat input is controlled by the source conditions and heat transfer mode. For a given voltage and resistance or fuel-air ratio, the same amount of heat is produced all the time every time. Electromagnetic heat input, however, produces heat that is proportional to the object being heated instead of the heater properties. Heat is produced in one of three ways, dielectric or eddy current, hysteresis loss (heating. Uniquely, the present disclosure is capable of achieving substantially controlled heating rates, even though electromagnetic heating of a fixed article is typically a non-controlled heating process that is proportional to the article being heated.

Figure 2:
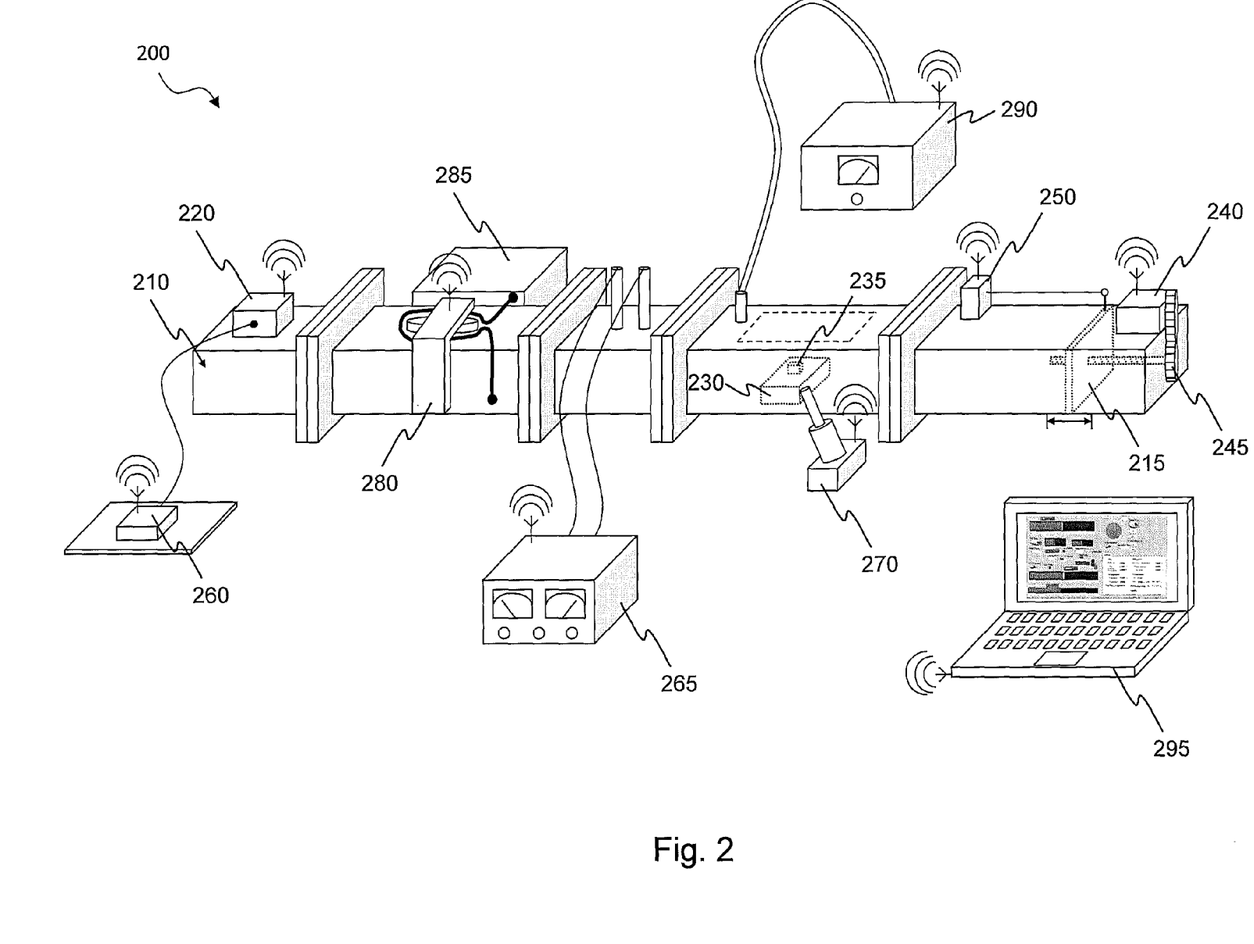
FIG. 2 illustrates a microwave system for joining two materials in accordance with the principles of the disclosure.

Turning now to FIG. 2, illustrated is a microwave system 200 for joining two materials in accordance with the principles of the disclosure. The microwave system 200, in accordance with the disclosure, initially includes a waveguide structure 210, the waveguide structure 210 having a microwave source 220 coupled thereto. The waveguide structure 210 may comprise a variety of different configurations in accordance with the principles of the disclosure. The waveguide structure 210 need, however, have a reflective surface 215 distal the microwave source 220, such that the microwave source 220 can project microwaves toward the reflective surface 215. Thus, the waveguide structure 210 should be a closed-end waveguide.

As previously indicated, the waveguide structure 210 may vary based upon the intended use of the microwave system 200. In one embodiment, such as illustrated in FIG. 2, the waveguide structure 210 is a WR340 waveguide. As those skilled in the art appreciate, the WR340 waveguide is a rectangular waveguide that is suitable for most microwave frequencies, including the common 2.45 GHz frequency found in most residential and commercial microwave ovens. Other, non-rectangular, waveguide structures 210 are within the scope of the disclosure.

Figure 3:
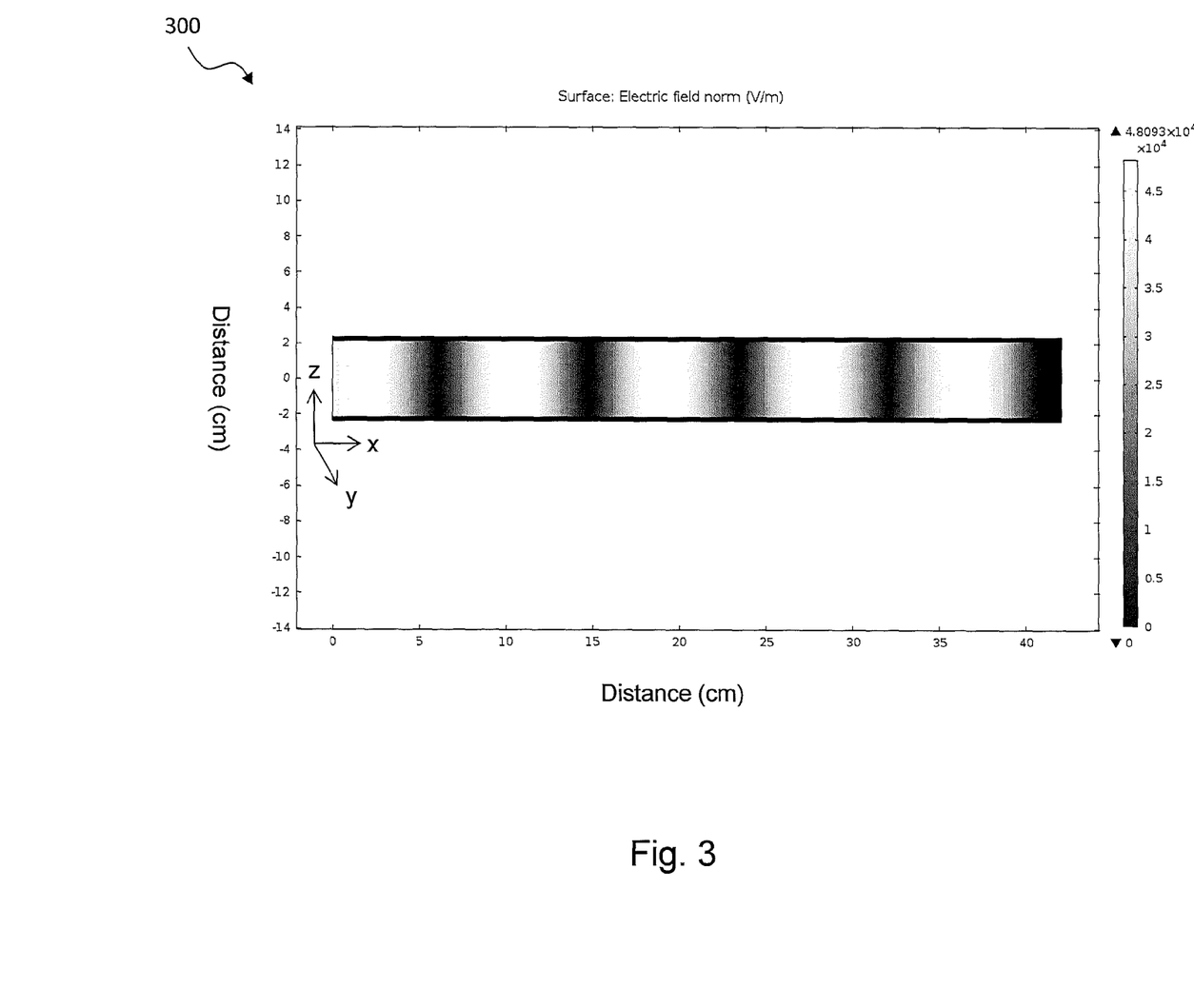
FIG. 3 illustrates a microwave field distribution.

The significance of the embodiment of FIG. 2 is that unlike a traditional multi-mode microwave oven, this configuration establishes a single-mode waveform with both a transmitted and reflected wave. The microwave field distribution 300, in simulations, might look like that in FIG. 3. For an open-end waveguide, the microwave field distribution is a continuous light section of high intensity along the x-axis of the waveguide. For a closed-end waveguide, such as the waveguide structure 210, the standing wave is made up of the components of the forward wave propagating from the microwave source 220 at the left of the waveguide and the reflected wave propagating from the reflective surface at the end of the waveguide. Depending upon the relative phase difference between the forward and reflected waves, a net field strength is set up as a function of the x position and the total waveguide length, thereby providing a microwave field distribution 300 similar to that shown in FIG. 3.

Returning to FIG. 2, the microwave source 220 may be any microwave source consistent with the principles of the present disclosure. In one embodiment, however, the microwave source 220 is a 2.45 GHz frequency microwave source. In other embodiments, however, the microwave source might have a frequency ranging from about 1.0 to about 5.0 GHz, as well as other frequencies outside of this range.

The waveguide structure 210 of the instant disclosure also may include a stage 230 located between the microwave source 220 and the reflective surface 215 for positioning an article 235 within the waveguide structure 210. The term "stage" as used throughout this disclosure is intended to refer to a spot having a known location within the waveguide structure 210. In certain embodiments, the stage 230 is just a marker indicating a position wherein the article 235 is to be positioned. In other embodiments, the stage 235 is a raised feature that the article 235 is to be positioned on. In yet another embodiment, as will be discussed further below, the stage 235 is a raised movable stage.

In accordance with one embodiment of the disclosure, the reflective surface 215 illustrated in FIG. 2 is configured to move toward or away from the article 235 to change a relative position of the article 235 with respect to the reflective surface 215. As discussed above, by changing the relative position of the two features, the microwave field distribution within the waveguides structure 210 may be changed. For example, the microwave field distribution illustrated in the example of FIG. 3 would move forward or backwards along the x-axis depending on the movement of the reflective surface 215. Accordingly, the article 235 can be heated at a faster, or slower, heating rate—depending on where the article 235 is positioned relative to the microwave field distribution.

In the illustrated embodiment, a motor 240 and a collection of gears 245 are configured to move the reflective surface 215 relative to the article 235. In the illustrated embodiment, a worm gear is coupled to the reflective surface 215 to move it relative to the article 235. It should be noted that the present disclosure is in no way limited to the use of the gears, particularly a worm gear, to move the reflective surface 215.

It is helpful to know the relative position of the reflective surface 215. Accordingly, in the embodiment of FIG. 2, a location device 250 is coupled to the reflective surface 215. More particular to the embodiment of FIG. 2, a string potentiometer is coupled to the reflective surface 215. Accordingly, no matter where the reflective surface 215 is located, its position may be known. Those skilled in the art appreciate that other location devices 250 may be used, including those that are not physically coupled to the reflective surface 215 (e.g., optical, RF, etc. methods).

To further assist in the change of the microwave field distribution, the microwave source 220 of the microwave system 200 may have an adjustable output power. By adjusting the output power of the microwave source 220, the microwave field distribution may be further controlled. In certain embodiments, such as the embodiment of FIG. 2, the microwave source 220 only has a few preset output power levels. For example, the microwave source 220 might have preset output power levels of 900 Watts, 750 Watts and 600 Watts. Nevertheless, there may be certain situations wherein a desired output power level is between these preset levels. In this circumstance, an inverter, such as the inverter 260 illustrated in FIG. 2, may be used to cut the waves from the microwave source 220, and thereby provide a more desirable output power level. Those skilled in the art understand the types of inverters 260 that may be used to cut the output power level of the microwave source 220. In accordance with the disclosure, the microwave system 200 may include a wave power display 265, which is intended to be representative of the output level being produced by the microwave source 220.

The microwave system 200 illustrated in FIG. 2 may include additional elements. For example, the microwave system 200 may additionally include a temperature sensor 270 for obtaining change in temperature information of the article 235. In this instance, the temperature sensor 270 would be directed (e.g., movably directed) toward the article 235. Those skilled in the art understand the myriad of different temperature sensors 270 that might be used and remain within the purview of the disclosure. Nevertheless, in the embodiment of FIG. 2, an infrared (IR) non-contact camera based temperature sensor is used.

The microwave system 200 illustrated in FIG. 2 may additionally include an isolator 280. The isolator 280, in this embodiment, is configured to isolate the microwave source 220 from the reflective wave so that it does not get dissipated as heat. In the illustrated embodiment, the isolator 280 is coupled to a water block 285. While an isolator 280 and water block 285 are illustrated in FIG. 2, those skilled in the art understand the various different products and methods that might be used to protect the microwave source 220 from the reflective wave.

The microwave system 200 illustrated in FIG. 2, at least in this embodiment, further includes an inert gas source 290 plumbed with the waveguide structure 210. The inert gas source 290, in this embodiment, feeds an inert gas, such as argon, into the waveguide structure 210. The inert gas source 290, in this embodiment, is configured to make sure the heating of the article 235 occurs in a plasma-less environment. In an alternative embodiment, the waveguide structure 210 is maintained at a substantial vacuum during the heating of the article 235. The phrase "substantial vacuum," as used herein is defined as a vacuum of 1 Torr or less. The substantial vacuum, in this embodiment, also attempts to create a plasma-less heating environment. As those skilled in the art appreciate, the existence of a plasma discharge while heating certain materials may be catastrophic to the article 235, particularly when joining polymer/ceramic materials.

The microwave system 200 illustrated in FIG. 2 further includes a controller 295. The controller 295, in the illustrated embodiment, is software housed on a computer, such as a server, a desktop computer, a laptop computer, a tablet computer, a cellular telephone, etc. The controller 295, in the illustrated embodiment, is wirelessly coupled to the microwave source 220, quite possibly the stage 230, the motor 240, the location device 250, the inverter 260, the wave power display 265, the temperature sensor 270, the isolator 280 and water block 285, and the inert gas source 290. The controller 295 need not be coupled to each of the listed devices, and thus might only be coupled to a few of such devices. Moreover, the controller need not couple to the devices wirelessly, and could just as well couple to them over a fixed wire network.

Unique to the present disclosure, the controller 295 (e.g., being coupled to certain ones of the devices of the microwave system 200) may be configured to receive temperature information from the temperature sensor 270 regarding the article 235, and thereby continually change the relative position of the article 235 with respect to the reflective surface 215. In the illustrated embodiment, the controller 295 is configured to continually change the position of the reflective surface 215 to dynamically change the microwave field distribution. In this situation, the controller 295 might operate the motor 240 and location device 250 to dynamically position the reflective surface 215 at a desired location, and thereby change the microwave field distribution surrounding the article 235. The controller 295 may additionally continually change the output power level of the microwave source 220 and thereby change the microwave field distribution surrounding the article 235. Ultimately, the inclusion of the controller 295 allows the microwave system 200, in certain embodiments, to operate in a closed-loop mode, wherein the microwave field distribution surrounding the article 235 is dynamically changed (e.g., in real time) to provide a substantially controlled heating rate to the article 235. Heretofore the present disclosure, a closed-loop microwave system capable of joining two dissimilar materials did not exist. Moreover, one did not exist in a plasma-less environment using dielectric heating, eddy current heating, or hysteresis heating to join two dissimilar materials. In accordance with the disclosure, the dielectric heating, eddy current heating, or hysteresis heating may be balanced with forced cooling of the article. For example, forced cooling of the stage on which the article is placed may be used to balance the dielectric heating, eddy current heating, or hysteresis heating. As those skilled in the art understand, the forced cooling may be accomplished by backfilling the waveguide structure 210 with helium or other high thermal conductivity gases. Additionally, the forced cooling may be accomplished by using solid state cooling devices, among other methods.

Figure 4:
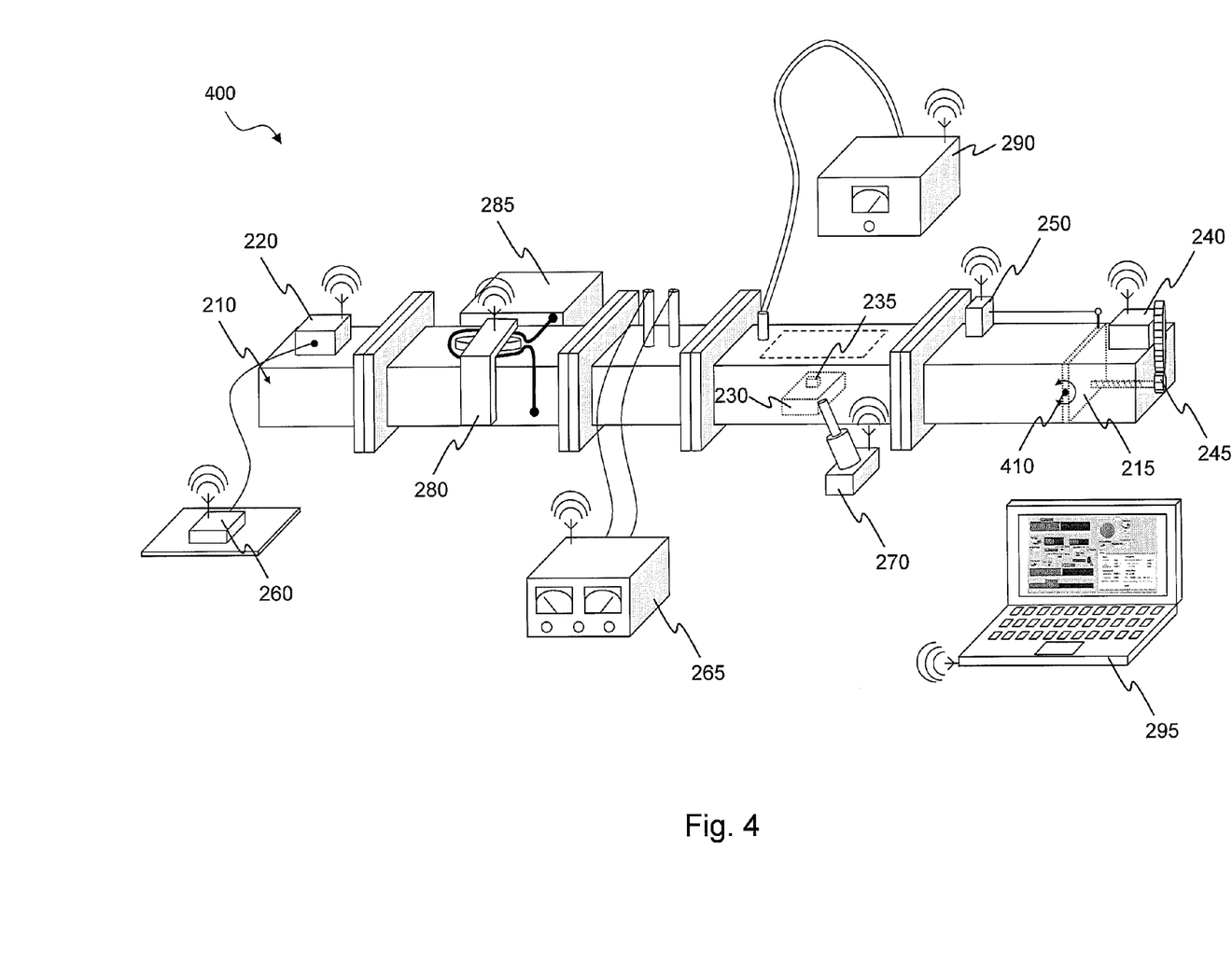
FIG. 4 illustrates a microwave system manufactured in accordance with an alternative embodiment of the disclosure.

Turning briefly to FIG. 4, illustrated is a microwave system 400 manufactured in accordance with an alternative embodiment of the disclosure. The microwave system 400 is similar in many respects to the microwave system 200 illustrated in FIG. 2. Accordingly, like reference numerals are used to reference like features. In contrast to the microwave system 200 of FIG. 2, the microwave system 400 of FIG. 4 rotates a position of the reflective surface 215, as opposed to the embodiment of FIG. 2 moving the reflective surface 215 toward or away from the article 235. For example, in certain situations the reflective surface 215 might be perpendicular to a length of the waveguide structure 210, and in other situations the reflective surface 215 might be rotated a set number of degrees (e.g., positive or negative) from perpendicular. Those skilled in the art understand the types of devices that might be used to rotate the reflective surface 215. In the illustrated embodiment, the motor 240 and gears 245 are configured to rotate the reflective surface about a pivot point 410.

Figure 5:
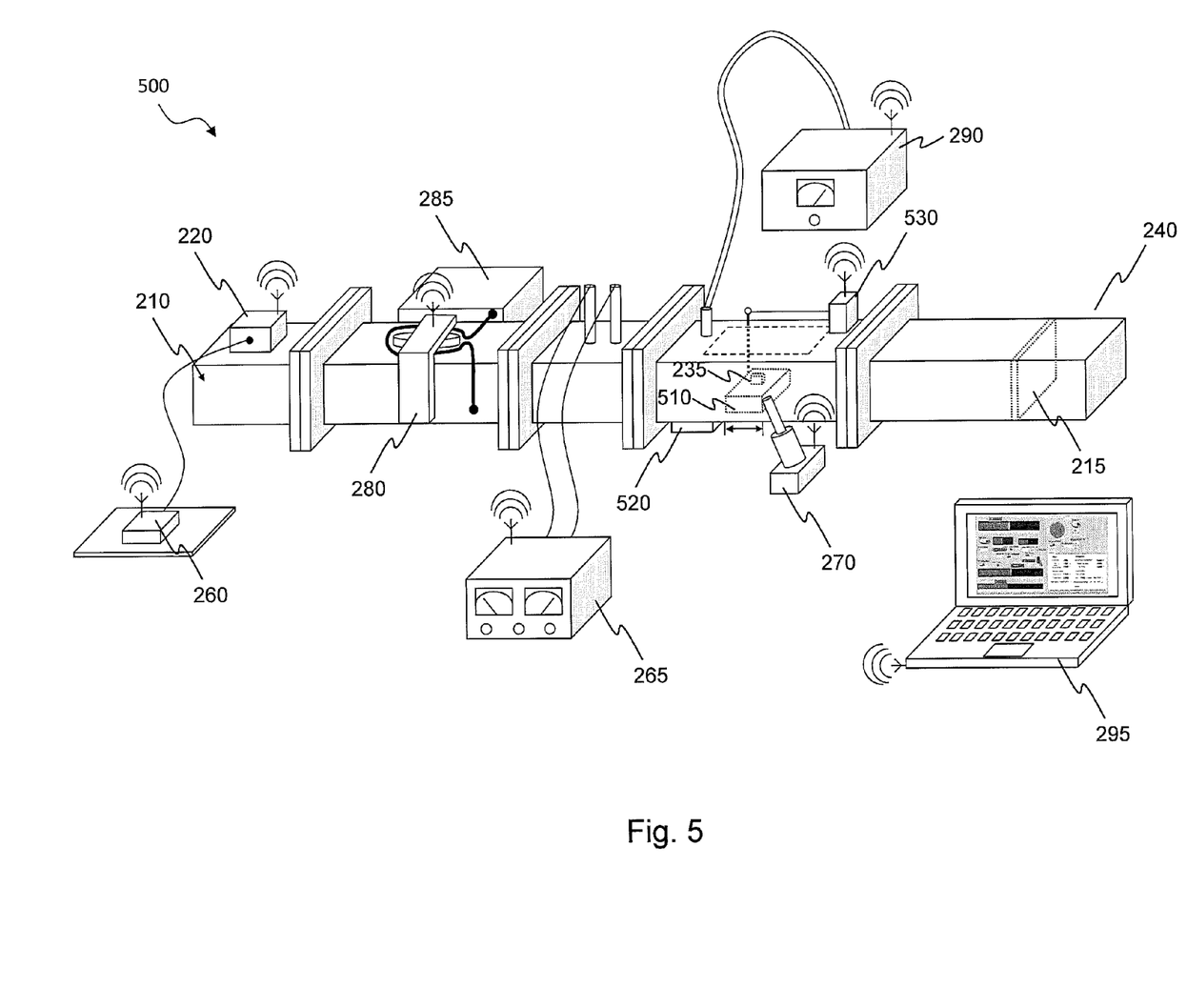
FIG. 5 illustrates a microwave system manufactured in accordance with an alternative embodiment of the disclosure.

Turning briefly to FIG. 5, illustrated is a microwave system 500 manufactured in accordance with an alternative embodiment of the disclosure. The microwave system 500 is similar in many respects to the microwave system 200 illustrated in FIG. 2. Accordingly, like reference numerals are again used to reference like features. In contrast to the microwave system 200 of FIG. 2, the microwave system 500 of FIG. 5 moves the article 235 relative to the reflective surface 215 (e.g., toward or away from the reflective surface 215). In this embodiment, the article 235 is positioned on a movable raised stage 510. Moreover, a motor 520 and location device 530 may be used to move and position the raised stage 510, and thus ultimately the article 235.

Figure 6:
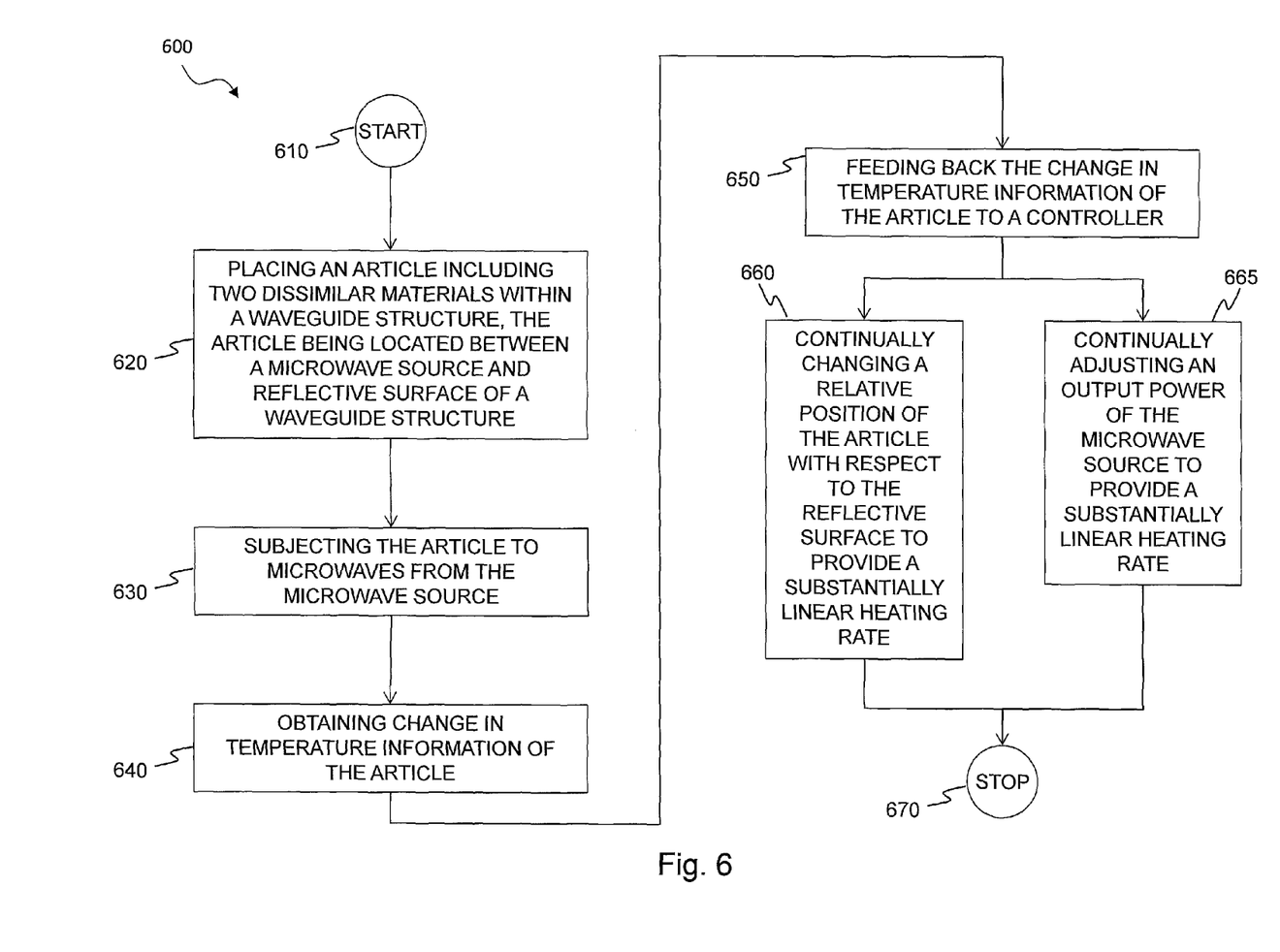
FIG. 6 illustrates a flow diagram illustrating one method for joining two dissimilar materials in accordance with the disclosure.

Turning now to FIG. 6, illustrated is a flow diagram illustrating one method 600 for joining two dissimilar materials in accordance with the disclosure. The method 600 begins in a start step 610. Thereafter, in a step 620, an article including two dissimilar materials is placed within a waveguide structure of a microwave system in accordance with this disclosure. As discussed in detail above, the article may comprise, among others, a polymer/ceramic material attempting to be joined to a metallic material. In a step 630, the article is subjected to microwaves from the microwave source. In this step, the process of heating the article is just beginning. The article, in this embodiment, is being subjected to dielectric, eddy current, or hysteresis heating.

Thereafter, in a step 640, change in temperature information is obtained from the article. If using a microwave system, such as the one discussed above with respect to FIG. 2, an infrared temperature sensor might be used to obtain the change in temperature information. The change in temperature information might be change in temperature over time information that is generated by the temperature sensor. Alternatively, the change in temperature information might just be the temperature of the article at a point in time, and then the controller might integrate the temperature readings over time.

In a step 650, the change in temperature information is fed to a controller, such as the controller 295 of FIG. 2. The controller, then in steps 660 and 665 continually adjusts parameters of position of the article with respect to the reflective surface, and/or the output power of the microwave source, respectively, to provide a substantially controlled heating rate to the article. The steps 660 and 665 may be conducted in any order. Alternatively, steps 660 and 665 may be conducted concurrently. Certain embodiments also exist wherein only one of the steps 660 and 665 occurs.

As discussed in detail above with respect to FIG. 2, the relative position of the article with respect to the reflective surface may be changed in a number of different manners. In one embodiment, the reflective surface moves while the article remains still. In another embodiment, the article moves while the reflective surface remains still. In yet another embodiment, an angle of the reflective surface changes while the article remains still. In even yet another embodiment, two or more of these parameters are continually changed.

As discussed in detail above with respect to FIG. 2, the output power of the microwave power may be continually changed in a variety of different ways. For example, a rough setting of the microwave source may be changed. Alternatively, a finer setting of the microwave source may be changed. Additionally, a device, such as an inverter, might be used to cut the output power of the microwave source. Moreover, combinations of these techniques might also be used.

The temperature information of the article continues to be observed, and fed back to the controller in this embodiment, while the controller continues to dynamically repeat steps 660 and/or 665, until the two dissimilar materials are sufficiently joined. Accordingly, a closed-loop system, such as this, is used to join the two dissimilar materials. Once the two dissimilar materials are appropriately joined the process would stop in a stop step 670.

A method for joining to dissimilar materials, such as that discussed herein, has many different applications. In one embodiment, the method applies to semiconductor/metal joining for thermoelectric modules (e.g., bismuth telluride to copper). Nevertheless, it is believed that the method could be used for joining other advanced electronic materials such as Polymeric Matrix Composites (PMC's) and Ceramic Matrix Composites (CMC's) in similar and dissimilar combinations. In addition, the method could be used to engineer the characteristics of advanced materials and structures such as carbon nanotubes.

Additionally, the method could be used for biomedical implants applications, wherein metal barrier coatings can be re-melted in the microwave after spray deposition of heavy metals such as Mo, Co on ceramic or polymeric composite stems—a process known as compacting—to avoid pores or discontinuities in the coating. All this would be possible while avoiding thermal shock at the interface of the substrate and coating—even while the two dissimilar materials have different CTE's as well as very different thermal conductivities.

Additionally, the method could be used in the aircraft industry. For example, a relatively recent powder metallurgy product developed by GE called Titanium Aluminide (essentially a 50/50 mix of Ti and Al, which is a brittle intermetallic with very high melting point that behaves like a ceramic) is being used for jet engine blades, increasing the operating temperature while reducing the weight of the engine, making them more fuel efficient. Welding of this advanced materials proved extremely difficult for repairs and alike, requiring impractically high 1,000 degree Fahrenheit preheats, even for solid state welding such as Friction Stir Welding. For small parts, microwave welding with a different metal at the interface would heat up the TiAl from within, acting as a preheat, while the metal at the interface could be melted to accomplish joining.

Although the present disclosure has been described in detail, those skilled in the art should understand that they can make various changes, substitutions and alterations herein without departing from the spirit and scope of the disclosure in its broadest form.

What is claimed is:

1. A method for joining two materials, comprising:
   placing an article including two dissimilar materials within a waveguide structure, the article located between a microwave source and reflective surface of the waveguide structure; and
   subjecting the article to microwaves from the microwave source; and
   feeding back change in temperature information of the article being subjected to the microwaves to a controller to continually change a relative position of the article with respect to the reflective surface and continually adjust the output power of the microwave source, thereby dynamically changing a microwave field distribution within the waveguide and join the two dissimilar materials.

2. The method of claim 1, wherein the controller continually changes the relative position of the article with respect to the reflective surface and continually adjusts the output power of the microwave source to provide a substantially controlled heating rate to the article.

3. The method of claim 1, wherein changing a relative position of the article with respect to the reflective surface includes moving the reflective surface toward or away from the article.

4. The method of claim 1, wherein changing a relative position of the article with respect to the reflective surface includes rotating a position of the reflective surface.

5. The method of claim 1, wherein changing a relative position of the article with respect to the reflective surface includes moving the article toward or away from the reflective surface.

6. The method of claim 1 wherein subjecting the article to microwaves includes subjecting the article to microwaves within a vacuum or within an inert gas atmosphere.

7. The method of claim 1 wherein the two dissimilar materials comprise a ceramic/polymer and a metallic.

8. A microwave system for heating, including:
- a waveguide structure having a reflective surface;
- a microwave source coupled to the waveguide structure and configured to project microwaves toward the reflective surface;
- a stage located within the waveguide structure between the microwave source and the reflective surface, the stage configured to position an article within the waveguide structure, wherein at least one of the reflective surface or stage is configured move to change a relative position of the article with respect to the reflective surface; and
- a controller coupled to the at least one of the reflective surface or stage configured to move and the microwave source, the controller configured to receive change in temperature information of the article and continually change the relative position of the article with respect to the reflective surface and continually adjust an output power of the microwave source.

9. The microwave system of claim 8, wherein the controller is configured to continually change the relative position of the article with respect to the reflective surface or continually adjust the output power of the microwave source to provide a substantially controlled heating rate to the article.

10. The microwave system of claim 8, wherein the reflective surface is configured to move toward or away from the article to change the relative position of the article with respect to the reflective surface.

11. The microwave system of claim 8, wherein the reflective surface is configured to rotate to change the relative position of the article with respect to the reflective surface.

12. The microwave system of claim 8, wherein the stage is configured to move toward or away from the reflective surface to change the relative position of the article with respect to the reflective surface.

13. The microwave system of claim 8, further including an inverter coupled to the microwave source, the inverter configured to adjust an output power of the microwave source.

14. The microwave system of claim 8, wherein the waveguide structure is configured to operate at a substantial vacuum.

15. The microwave system of claim 8, wherein the waveguide is plumbed such that it can receive and operate in the presence of an inert gas.

16. A method for joining two materials, comprising:
- placing an article including two dissimilar materials within a waveguide structure, the article located between a microwave source and reflective surface of the waveguide structure; and
- heating the article in a plasma-less environment using dielectric heating, eddy current heating, or hysteresis heating by subjecting the article to microwaves from the microwave source; and
- feeding back change in temperature information of the article being subjected to the microwaves to a controller to continually change a relative position of the article with respect to the reflective surface and continually adjust the output power of the microwave source, thereby dynamically changing a microwave field distribution within the waveguide and join the two dissimilar materials.

17. The method of claim 16, wherein changing a relative position of the article with respect to the reflective surface includes moving the reflective surface toward or away from the article.

18. The method of claim 16, wherein changing a relative position of the article with respect to the reflective surface includes rotating a position of the reflective surface.

19. The method of claim 16, wherein changing a relative position of the article with respect to the reflective surface includes moving the article toward or away from the reflective surface.

20. The method of claim 16 wherein subjecting the article to microwaves includes subjecting the article to microwaves within a vacuum or within an inert gas atmosphere.

* * * * *